(12) United States Patent
Haerle et al.

(10) Patent No.: US 6,486,945 B1
(45) Date of Patent: Nov. 26, 2002

(54) METHOD AND CIRCUIT ARRANGEMENT FOR MEASURING THE LIGHT OUTPUT OF AN EMITTER DIODE OF AN OPTICAL MONITORING UNIT

(75) Inventors: Thomas Haerle, Augsburg (DE); Guenter Reisacher, Ingolstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/515,317

(22) Filed: Feb. 29, 2000

(30) Foreign Application Priority Data

Mar. 23, 1999 (DE) ......................................... 199 12 971

(51) Int. Cl.$^7$ ................................................. G01J 1/42
(52) U.S. Cl. .................... 356/218; 356/342; 250/214 R; 250/214 LS; 250/574; 340/602
(58) Field of Search ................................. 356/213, 214, 356/215, 216, 217, 218, 219, 221, 222, 5.06, 336, 338, 342; 250/214 R, 214 LA, 574, 559.38, 559.29, 214 LS; 342/26, 54; 340/602, 905

(56) References Cited

U.S. PATENT DOCUMENTS

| | | | |
|---|---|---|---|
| 4,394,570 A | * 7/1983 | Mizokami ............... 250/214 P |
| 4,605,302 A | 8/1986 | Loefgren et al. |
| 4,722,599 A | * 2/1988 | Fruengel et al. ................. 356/5 |
| 4,874,242 A | * 10/1989 | Bezard et al. ............... 356/341 |
| 4,931,767 A | * 6/1990 | Albrecht et al. ............. 340/601 |
| 5,241,315 A | * 8/1993 | Spinhirne ..................... 342/54 |
| 5,504,577 A | * 4/1996 | Lonnqvist et al. ........... 356/342 |
| 5,880,836 A | * 3/1999 | Lonnqvist .................... 356/336 |

FOREIGN PATENT DOCUMENTS

| | | |
|---|---|---|
| DE | 4240395 | 6/1994 |
| DE | 19620147 | 12/1996 |
| DE | 19531917 | 3/1997 |
| DE | 19539422 | 4/1997 |
| DE | 19704793 | 8/1998 |
| EP | 0112498 | 7/1984 |
| EP | 0312788 | 4/1989 |

OTHER PUBLICATIONS

Article entitled "Reflexlichtschranke mit Pfiff", by Mathias Handwerker, Funkschau 20/1984, pp. 83–84.

* cited by examiner

Primary Examiner—Hoa Q. Pham
(74) Attorney, Agent, or Firm—W. F. Fasse; W. G. Fasse

(57) ABSTRACT

An optical monitoring unit includes a transmitting unit having plural light emitting diodes that are connected together two at a time in respective diode pairs. Each diode of each diode pair is respectively selectively connectable to a current source so as to operate as an active transmitting diode, or to a load resistor across which a voltage may be measured so as to operate as a monitoring diode. When any selected single diode is operated as the transmitting diode, its light output is measured and evaluated by operating the other diode of the pair as the monitoring diode, which receives optical crosstalk from the light output of the transmitting diode and correspondingly generates a photoelectric current through the load resistor.

24 Claims, 3 Drawing Sheets

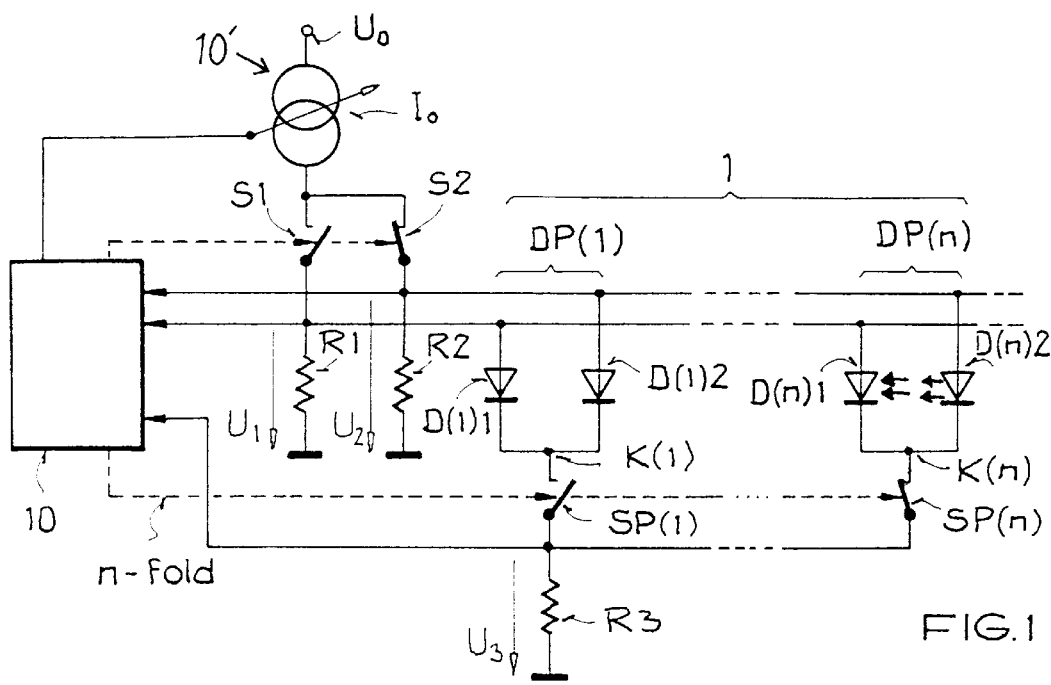
FIG. 1
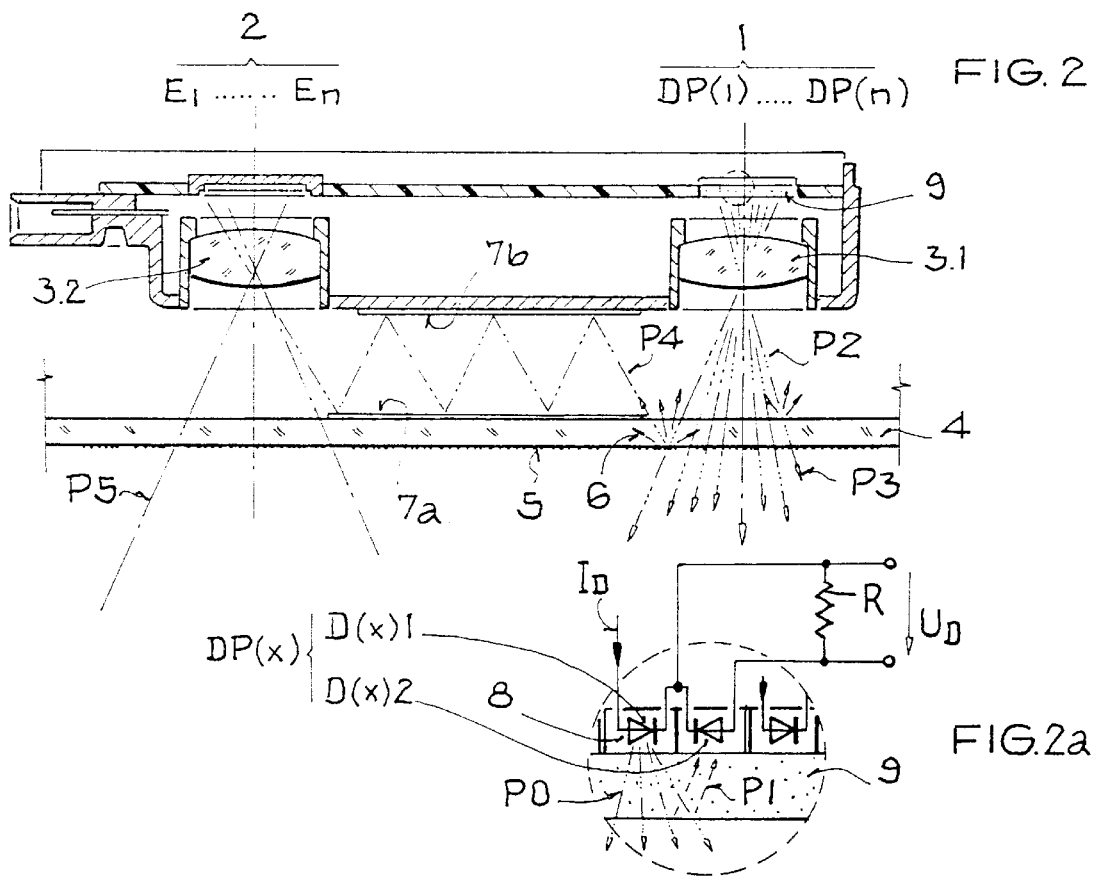
FIG. 2
FIG. 2a

METHOD AND CIRCUIT ARRANGEMENT FOR MEASURING THE LIGHT OUTPUT OF AN EMITTER DIODE OF AN OPTICAL MONITORING UNIT

FIELD OF THE INVENTION

The invention relates to a method and a circuit arrangement for receiving and evaluating the light output of a light emitting diode of an optical monitoring unit.

BACKGROUND OF THE INVENTION

Optical monitoring units which operate on the reflection principle and which include a transmitting unit for transmitting light to an object and a physically remote receiving unit for receiving the light reflected from the object, are known, for instance from DE 196 20 147, DE 197 04 793, EP 0 312 788 A2 or EP 0 112 498 A2, and are used for a variety of applications such as, for example, measurement of visibility range, optical seat occupation detection in motor vehicles, reflected light barriers and the like. The light output to be transmitted is determined by means of the diode current and stabilized through a control loop for keeping the diode current constant. The actual light output of the transmitting diodes depends, however, not only on their diode current but also on other influencing quantities, especially degradation and manufacturing tolerances. The light output is important for optical monitoring units because the if, light components reflected from the object must be noticeably emphasized relative to the unavoidable interference light, especially ambient light. To some extent also, a certain proportion of the emitted light is used to assess other quantities, for instance the distance of the object or the contamination in the beam path, for instance on a translucent cover. Even if a component of light reflected from a translucent cover within a housing of the monitoring unit as the result of contamination is guided back to the receiving unit, as proposed in DE 197 04 793, it is quite possible that this light component, which is interpreted there as a contamination signal, might not be influenced by a fluctuating transmitted light output. The light reflected from the object to be monitored is also not suitable for the purposes of detection of light output variations, because the object range to be monitored can change.

Light output measurement involving additional measuring arrangements with further light-sensitive components cannot be considered for cost reasons.

SUMMARY OF THE INVENTION

It is an object of the invention to avoid or overcome the above problems of the prior art. According to the invention, a simple method is specified for detecting the light output of a light emitting diode without using additional light-sensitive components. Furthermore, a circuit arrangement for. performing the method according to the invention is extremely simple and permits, in particular, the integration of the transmitting diodes together with this circuit arrangement on a semiconductor substrate. Finally, two particularly preferred possible applications of the method according to the invention are presented.

The invention is based on the known property of all light-emitting diodes that when the polarity is reversed the diodes are light-sensitive at least to a small extent and at least for a specific wavelength range, and generate a photoelectric current or a photoelectric voltage across a resistor.

Initially, each light-emitting diode emits light in the forward direction if the voltage is sufficiently high. In this form, diodes are generally used as transmitting diodes and are optimized according to this function in terms of material selection and design. Under appropriately intensive light influence of suitable wavelength being received by the diode, however, every light-emitting diode also generates a photoelectric current flowing in the reverse direction. Apart from light-emitting diodes, components with a physically comparable function, laser diodes for example, can transmit active optical fields or the like. In the article by Mr. Mathias Handwerker in Funkschau 20/1984, p. 83 ff., a reflected light barrier is described, for example, in which two LEDs are used in a housing where one of these LEDs serves as a receiver for the light reflected outside. Reference is made here already to the relatively high photoelectric voltage that can be achieved with certain LEDs and is comparable with photodiodes. Crosstalk of the light to be transmitted automatically occurs here onto the receiver; this is suppressed by appropriate circuit devices.

It is precisely this optical crosstalk between diodes however, that can be utilized in order to detect the light output of a given diode in an optical monitoring unit with a plurality of transmitting diodes in a transmitter unit. For detecting the light power, only one of the diodes is operated as a transmitting diode to emit light at any one time, while at least one other diode is connected. as a receiver to receive the light component reflected inside the transmitting units, which is recorded as a signal that is proportional to the light output. The light output is derived from this.

With all light-emitting diodes, it is possible to detect the light output with at least sufficient accuracy to decide whether light is still being emitted at all, because the crosstalk is relatively powerful compared with influences due to ambient stray light. Precisely because of this direct coupling, the intensity of the reflected light component also can be distinguished for a wide range of light power with the simplest of circuit devices. This form of measurement is in any case considerably more accurate and reliable than derivation from the current flow.

Naturally, it is only important for measuring the light output that only one of the transmitting diodes transmits in order to void influences from the other diodes on the receiver. However, it is sufficient to perform measurement of the light output at certain intervals, and in normal operation all transmitting diodes can be operated as such, also at the same time where applicable.

It is particularly preferable to use the diode immediately adjacent to the transmitting diode as the receiver because the optical crosstalk is particularly high here, and also because no allowance need be made for the distance between the active transmitting diode and the adjacent diode used as the receiver. For this method, a particularly preferred circuit arrangement results, in which two transmitting diodes at a time are connected together in pairs.

BRIEF DESCRIPTION OF THE DRAWINGS

FIG. 1 schematically shows a circuit arrangement for performing the method with transmitting diodes connected together in pairs and circuit devices for driving these each way.

FIG. 2 schematically shows a monitoring unit with a transmitting device and a receiving device physically separated from it, where part of the light reflected on the translucent cover of the transmitting unit is directed to the receiving unit to evaluate the contamination.

FIG. 2a schematically shows an enlarged detail portion of FIG. 2.

DESCRIPTION OF THE PREFERRED EMBODIMENTS

Figure 3:
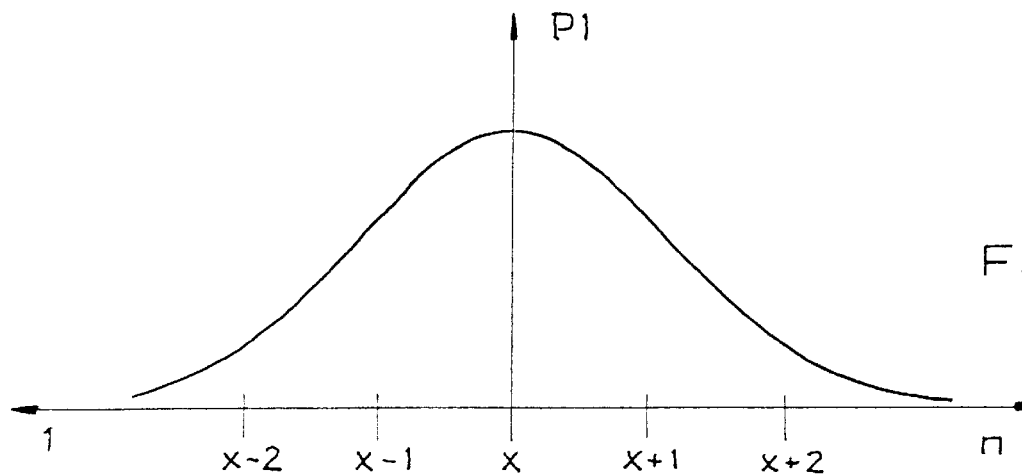
FIG. 3 graphically shows the intensity of the stray light in relation to the distance of the transmitting diode from the diode connected as a receiver.

FIG. 1 shows the circuit arrangement within the transmitting unit 1 of a monitoring unit with an even number, divisible by 2, of 2×n transmitting diodes D which are connected together in pairs to form n pairs DP(1) ... DP(n). Each of the diodes D can be connected selectively both as a transmitting diode and as a receiver by suitably controlling the circuit devices S1, S2 and SP(1) to SP(n). This will be explained below on the basis of the nth diode pair DP(n). Thus, circuit device S2 is closed and therefore current can flow from the current source 10' of the central unit 10 via S2 to the diode D(n)2 and via this to and through the closed circuit device SP(n) and the resistor R3 to ground. The resistor R3 also serves as a shunt for current measurement.

Thereby, the transmittin g diode D(n)2 emits light of which a certain proportion is detectable by direct crosstalk or reflection at the other diodes, provided they are connected as a receiver. In this example embodiment, each diode pair DP(n) is connected selectively through a circuit device SP(n) with R3 to ground. This selectively connected diode pair DP(n) is respectively active, i.e. one of the transmitting diodes emits light and at the other diode connected as a receiver this light can be detected. In this example shown here, the diode D(n)1 is currently connected as a receiver by having opened the circuit device S1 while the circuit device SP(n) is closed so that this diode generates a photoelectric current according to the light which is received by this diode D(n)1, which further is related to the light output of the active transmitting diode D(n)2. This photoelectric current is registered across the load resistance R1 as voltage U1. By changing the respective switching position of the circuit devices S1 and S2, the diode D(n)1 would become the active transmitting diode and the diode D(n)2 would become the receiver of which the photoelectric current is then registered via the load resistor R2 as voltage U2 when circuit device S2 is open.

The control of the circuit devices S1 and S2 as well as SP1 to SP(n) is effected here from the central unit 10 which includes a current source 10' which also measures the voltages U1, U2 and U3. As a particularly preferred further development, the exists of controllably driving the current source 10' so that the current flowing through the active transmitting diode D(n)2 is adjusted. In this process, however, not only is the current automatically controlled to a constant value but also adjusted according to the measured light output. If, for example, the diode D(n)1 is connected as a receiver and measures a weakening trend in the light output from the active transmitting diode D(n)2, then the central unit 10 can recognize this by a lower voltage drop U1 and can accordingly increase the current flowing through the transmitting diode D(n)2 by means of a suitable control signal to the current source 10'.

FIG. 2 now shows a monitoring unit comprising a transmitting unit 1 and a receiving unit 2. A plurality of diodes are arranged in diode pairs DP(1) ... DP(n) connected together in transmitting unit 1.

The receiving unit 2 consists of a number of receiving diodes E1 ... E(n) which are arranged at a distance from the transmitting unit 1. In front of the transmitting unit 1 there is a transmitting optical system 3.1 and in front of the receiving unit 2 there is a receiving optical system 3.2 and in front of both together there is a translucent cover 4 on which, when contaminated to an increasing extent, a proportion of the transmitted light is reflected. The part P4 of the diffusely reflected light is then guided to the receiving unit 2 by light guiding means 7a and 7b for evaluation of a contamination signal, while the receiving unit 2 additionally receives the light P5 reflected in the target zone.

FIG. 2a shows the diode pair DP(x) schematically enlarged, where the diode D(x)1 is connected actively as the transmitting diode through which a diode current $I_D$, flows so that it emits. light with a light output PO. Arranged adjacently to it on the LED chip 8 is t he diode D(x)2, which is connected as the receiver in parallel to the active transmitting diode D(x)1. This receiving diode D(x)2 connected a s the receiver generates a photoelectric voltage $U_D$ which can be tapped across the load resistor R in accordance with the diffusely reflected or directly injected light component P1. Apart from the direct coupling, in particular reflection from a translucent protective layer 9 is decisive for this crosstalk from D(x)1 to D(x)2. This crosstalk serves to register the light output PO of the transmitting diode D(x)1 which can be assumed to be approximately proportional to the measured light component P1. By changing the connection, the diode D(x)1 can be used as the receiver while the diode D(x)2 is used as the transmitter, in the next step, as already explained in the context of FIG. 1.

For using the method in order to recognize contamination of a translucent cover 4 situated in front of the transmitting and receiving units 1, 2, this registering of the light output PO and P1 is especially of interest because aging and degradation of the transmitting diode can be identified more precisely as a result.

By contrast, the light component P4 used previously for detecting contamination of the cover 4 depends already on this light output PO, in addition however also on the contamination 5 and the diffuse reflections 6 which occur as a consequence with the differing intensity. P2 is the light component emitted through the protective layer 9 and the optical system 3.1 before reaching the cover 4, and P3 is the light component emitted through the cover 4 to the target zone. The light P5 reflected in the target zone is characterized to an even greater extent by external factors, in particular by the distance from the objects in the target zone and their reflection properties.

FIG. 3 shows clearly the distribution of the crosstalk effect in relation to the distance of the diode connected as a receiver from the active transmitting diode. The measurable transmission output, i.e. the diffusely reflected or directly injected returned light component P1 is, as expected, greatest in the immediate vicinity of the transmitting diode and declines rapidly as the distance increases.

Figure 4:
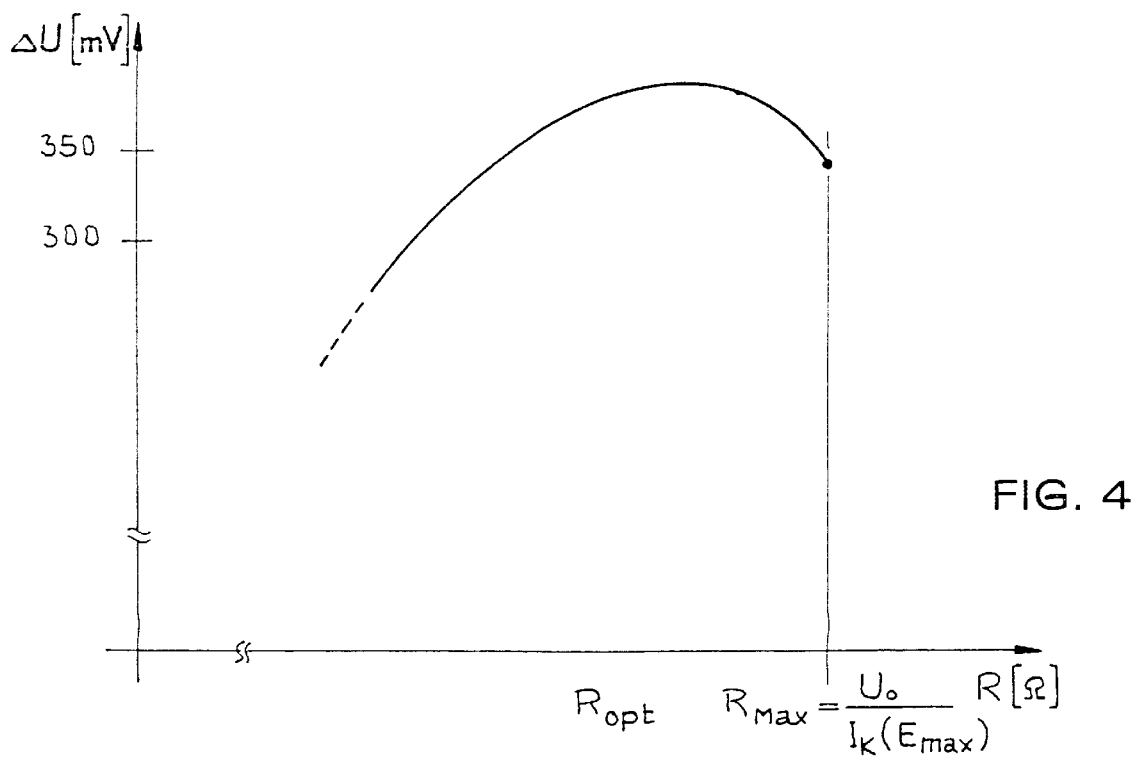
FIG. 4 graphically shows the optimization of the load resistance.
Figure 5:
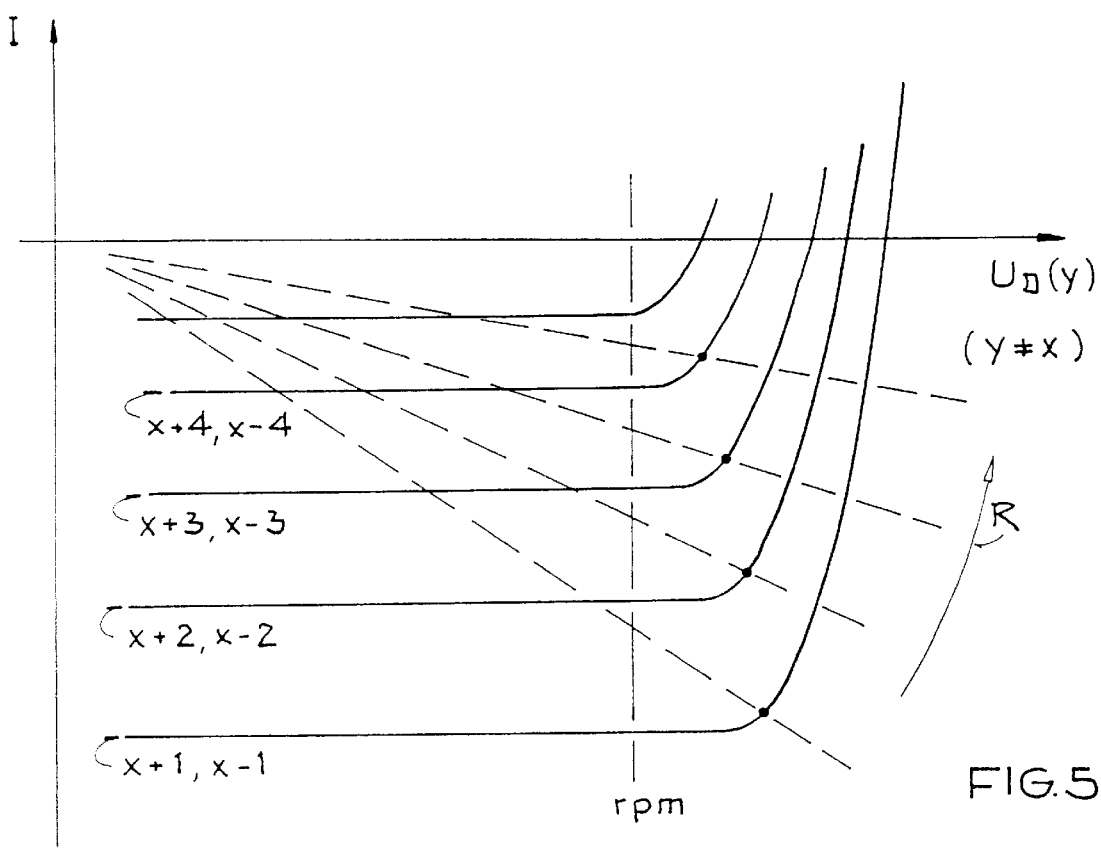
FIG. 5 graphically shows the current-voltage characteristic for a diode connected as a receiver with alternating active transmitting diodes and an illustration of the adaptation of the shunt for achieving optimum photoelectric voltage sensitivity.

Associated with this, however, in relation to a photoelectric current $I_D$ there also results the photoelectric voltage $U_D$ that is measurable in the diode across the respective load resistor at the respective adjacent diodes connected as receivers. If one chooses to dispense with elaborate amplification of the photoelectric voltage signal, the photoelectric voltage $U_D$ must reach a minimum voltage and exhibit a corresponding sensitivity for light output changes; this is assured only for the relatively closely adjacent diodes at a rated current, and at lower photoelectric currents is no longer necessarily assured for diodes connected as receivers and not in the immediate vicinity. If the diodes are not connected together in pairs and the adjacent diode of the diode pair is used for the measurement, a solution is to modify the resistor R, across which the photoelectric voltage is tapped, in such a way that when a given photoelectric current occurs the maximum photoelectric voltage sensitivity for light output changes is achieved as sketched in FIGS. 4 and 5.

Based on an assumed minimum and maximum light output, which correspond for instance to the ambient light without useful signal and in the second case with a useful signal with maximum permissible diode current, the receiving parameters of the diode selected as the receiver are determined, in particular their no-load voltage Uo at minimum light output and their short-circuit currents Ik(Emin, R),Ik(Emax,R) for minimum and maximum light output with a small load resistance R. The maximum value of the load resistance R can then be determined approximately from the short—circuit voltage Uo divided by the short—circuit current at maximum light output Ik(Emax,R). In general, however, this is not yet the working point of maximum sensitivity $\Delta U = R^*(Ik(Emin) - Ik(Emax))$, because Ik(Emin),Ik(Emax) are themselves dependent on R and the diode characteristic is non-linear, as can be seen clearly from the family of characteristics in FIG. 5 for various light outputs. The different light outputs already result from a respective different distance between the diode D(y) selected as a receiver, which can also be designated a monitor diode, and the various transmitting diodes $D(x), x \pm y$ that are active successively.

It can be seen clearly here that as the distance from the active transmitting diode increases, the photoelectric voltage $U_D$ can be prevented from dropping below the minimum voltage $U_{min}$ only by changing the load resistance R in such a way that in the case of more-remote diodes connected as the receivers, the resistance R must be correspondingly higher in order to achieve approximately the same sensitivity. A voltage sensitivity $\Delta U$ of more than 350 mV in initial measurements shows, however, that elaborate amplification of the signals can be dispensed with. The resistance control or switchover necessary for this can be omitted when operated in pairs in accordance with FIG. 1, once again illustrating clearly the particular advantage of this operation in pairs.

What is claimed is:

1. An optical arrangement comprising;
    a plurality of photodiodes including a first pair of photodiodes comprising a first diode and a second diode that each have an input side and an output side, wherein said output sides of said first and second diodes are connected to each other at a first node;
    a measurement resistor that is connected between said first node and a reference potential point, and that is adapted to enable a measurement of at least one of a voltage across said measurement resistor and a current flowing through said measurement resistor;
    a current source; and
    a switching device that is connected to and between said current source and said input sides of said first and second diodes, and that is adapted to selectively close a first circuit connection from said current source to said input side of said first diode so that said first diode operates as a transmitting diode and emits light, while opening a second circuit connection from said current source to said input side of said second diode so that said second diode operates as a monitoring diode and receives a part of said light emitted by said first diode and responsively thereto generates a photoelectric current.

2. The optical arrangement according to claim 1, wherein said switching device is further adapted to selectively close said second circuit connection so that said second diode operates as a transmitting diode and emits light, while opening said first circuit connection so that said first diode operates as a monitoring diode and receives a part of said light emitted by said second diode and responsively thereto generates a photoelectric current.

3. The optical arrangement according to claim 2, further comprising a load resistor arrangement connected to said input sides of said first and second diodes so that said photoelectric current respectively generated by said first diode or said second diode operating as said monitoring diode flows through said load resistor arrangement and generates a voltage that can be tapped from said load resistor arrangemnent.

4. The optical arrangement according to claim 1, further comprising a load resistor arrangement connected at least to said input side of said second diode so that said photoelectric current generated by said second diode operating as said monitoring diode flows through said load resistor arrangemnent and generates a voltage that can be tapped from said load resistor arrangement.

5. The optical arrangement according to claim 4, wherein said load resistor arrangement has a resistance value that maximizes a voltage variation sensitivity of changes of said voltage within an operating range of a current-voltage characteristic of said second diode operating as said monitoring diode and receiving said part of said light emitted by said first diode.

6. The optical arrangement according to claim 1, wherein said optical arrangement includes a transmitting unit that comprises said plurality of photodiodes and a receiving unit that comprises at least one receiving diode arranged separately from said plurality of photodiodes, and wherein said second diode is arranged relative to said first diode so that said part of said light that is emitted by said first diode and received by said second diode is a reflected part of said light that is reflected internally within said transmitting unit from said first diode to said second diode.

7. The optical arrangement according to claim 6, wherein said first and second diodes are arranged immediately adjacent to one another.

8. The optical arrangement according to claim 1, wherein said optical monitoring arrangement includes a transmitting unit and a receiving unit, said transmitting unit comprises said plurality of photodiodes, and said receiving unit comprises at least one receiving diode that is arranged separated from said photodiodes and is adapted to receive an externally reflected portion of said light emitted by said transmitting diode that is reflected back to said receiving unit from outside of said optical monitoring arrangement.

9. The optical arrangement according to claim 1, wherein said plurality of photodiodes further includes additional pairs of photodiodes that each have an input side and an output side, said output sides of said photodiodes of each respective pair among said additional pairs are connected to each other at a respective additional node, and said respective additional nodes are all connected to said measurement resistor and through said measurement resistor to said reference potential point.

10. The optical arrangement according to claim 9, further comprising an activating switch arrangement interposed between and connected to said measurement resistor and said nodes including said first node and said respective additional nodes, and wherein said activating switch arrangement is adapted to selectively close an output circuit connection from any selected single one of said nodes to said measurement resistor while opening a respective output circuit connection from all of said nodes other than said selected single one of said nodes to said measurement resistor.

11. The optical arrangement according to claim 1, further comprising a controller that is connected to receive at least one voltage signal indicative of said photoelectric current generated by said monitoring diode, and that is connected to said current source and adapted to provide to said current source a control signal responsive to said voltage signal.

12. The optical arrangement according to claim 1, wherein said optical monitoring arrangement includes a transmitting unit comprising said plurality of photodiodes, and a receiving unit comprising at least one receiving diode arranged separately from said transmitting unit, and further comprising a translucent cover arranged in front of both said transmitting unit and said receiving unit, and a light reflecting guide that is arranged along said translucent cover between said transmitting unit and said receiving unit and that is adapted to guide to said receiving unit a portion of said light that is emitted by said transmitting diode and reflected back from said translucent cover.

13. An optical monitoring arrangement comprising a receiving unit and a transmitting unit, wherein:
   said transmitting unit comprises plural pairs of photodiodes, a current source, and a load resistor;
   said receiving unit comprises at least one receiving diode arranged separately from said plural pairs of photodiodes;
   said pairs of photodiodes of said transmitting unit each include two respective diodes that are arranged immediately adjacent to each other and that are connected to each other at a respective diode pair connection node;
   said current source is connected in series with a selected first one of said diodes of each one of said plural pairs of photodiodes, to a common reference voltage point;
   said load resistor is connected in series with a selected second one of said diodes of each one of said plural pairs of photodiodes, to said common reference voltage point;
   said current source is adapted to cause an activation current to flow through said first one of said diodes of at least a selected one of said pairs of photodiodes and thereby to cause said first one of said diodes to emit light, a first portion of which impinges on said second one of said diodes of said selected one of said pairs of photodiodes, and a second portion of which is emitted from said transmitting unit;
   said second one of said diodes of said selected one of said pairs of photodiodes is adapted to generate a, photoelectric current that flows through said load resistor responsive to said first portion of said light impinging on said second one of said diodes; and
   said receiving diode is adapted to receive an externally reflected portion of said second portion of said light that is reflected back to said receiving unit from an external environment outside of said optical monitoring arrangement.

14. The optical monitoring arrangement according to claim 13, further comprising a first switching arrangement that is connected to said first diode and said second diode of each one of said pairs of photodiodes, and that is adapted to selectively close a series circuit of only a selected one of either said first diode or said second diode of each one of said pairs of photodiodes with said current source.

15. The optical monitoring arrangement according to claim 14, further comprising a second switching arrangement that is connected to each one of said respective diode pair connection nodes, and that is adapted to selectively close a circuit of only a selected single one of said diode pair connection nodes to said common reference voltage point.

16. The optical monitoring arrangement according to claim 13, further comprising a switching arrangement that is connected to each one of said respective diode pair connection nodes, and that is adapted to selectively close a circuit of only a selected single one of said diode pair connection nodes to said common reference voltage point.

17. A method of operating an optical monitoring arrangement including plural photodiodes in a transmitting unit and at least one receiving diode spatially separated from said plural photodiodes, said method comprising the steps:
   a) emitting light from a first one of said photodiodes, such that a first portion of said light impinges on a second one of said photodiodes and a second portion of said light is emitted from said transmitting unit into an external environment outside of said optical monitoring arrangement;
   b) receiving said first portion of said light with said second one of said photodiodes, and responsively thereto generating a photoelectric current or a photoelectric voltage in said second one of said photodiodes;
   c) evaluating said photoelectric current or said photoelectric voltage as being indicative of a light output of said light emitted from said first one of said photodiodes;
   d) receiving with said at least one receiving diode an externally reflected portion of said second portion of said light that is reflected from said external environment back to said at least one receiving diode, and responsively thereto generating a signal representative of a feature of said external environment; and
   e) selecting a first different one of said plural photodiodes as said first one of said photodiodes, selecting a second different one of said plural photodiodes as said second one of said photodiodes, and then repeating at least said steps a), b) and c) with said first and second different ones of said photodiodes.

18. The method according to claim 17, wherein said step a) comprises emitting said light only and singly from said first one of said photodiodes and not from any other of said photodiodes during at least a time interval for evaluating said light output of said first one of said photodiodes.

19. The method according to claim 17, wherein said first portion of said light is caused to impinge on said second one of said photodiodes by internally reflecting said first portion of said light within said transmitting unit from said first one of said photodiodes to said second one of said photodiodes.

20. The method according to claim 17, wherein said step c) comprises evaluating said photoelectric current or said photoelectric voltage as being proportional to said light output.

21. The method according to claim 17, further comprising selecting or arranging said first and second ones of said photodiodes among said plural photodiodes such that said first and second ones of said photodiodes are immediately adjacent to each other.

22. The method according to claim 17, wherein said step of emitting said light from said first one of said photodiodes comprises supplying an energizing current to said first one of said photodiodes, and further comprising a step of controlling and adjusting a magnitude of said energizing current responsive to said evaluating in said step c).

23. The method according to claim 17, wherein said optical monitoring arrangement further includes a translucent cover that is arranged in front of said transmitting unit and said at least one receiving diode and that has contamination thereon, wherein said method further comprises determining a degree of said contamination by reflecting and guiding onto said at least one receiving diode an internally reflected portion of said light that is emitted from said first one of said photodiodes and is reflected from said translucent cover and said contamination thereon internally within said optical monitoring arrangement, and evaluating an intensity of said internally reflected portion of said light in comparison to said light output evaluated in said step c).

24. A method of operating an optical transmitting unit including:
- a first photodiode;
- a second photodiode;
- an electrical power source;
- an electrical current or voltage measuring device; and
- a circuit arrangement adapted selectively to connect either selected one of said photodiodes to said electrical power source so that said selected one of said photodiodes operates as a transmitting diode and emits light, and simultaneously to connect the other one of said photodiodes to said measuring device so that said other one of said photodiodes operates as a monitoring diode and generates a photoelectric current responsive to receiving a portion of the light emitted by said selected one of said photodiodes, wherein said method comprises the steps:

a) selecting said first photodiode as said selected one of said photodiodes, switching said circuit arrangement to connect said first photodiode to said power source and to connect said second photodiode to said measuring device, operating said first photodiode as said transmitting diode and emitting light therefrom, and operating said second photodiode as said monitoring diode and generating a photoelectric current therewith responsive to receiving a portion of said light emitted by said first photodiode; and b) at a time other than said step a), selecting said second photodiode as said selected one of said photodiodes, switching said circuit arrangement to connect said second photodiode to said power source and to connect said first photodiode to said measuring device, operating said second photodiode as said transmitting diode and emitting light therefrom, and operating said first photodiode as said monitoring diode and generating a photoelectric current therewith responsive to receiving a portion of said light emitted by said second photodiode.

\* \* \* \* \*